Figures 1, 2:
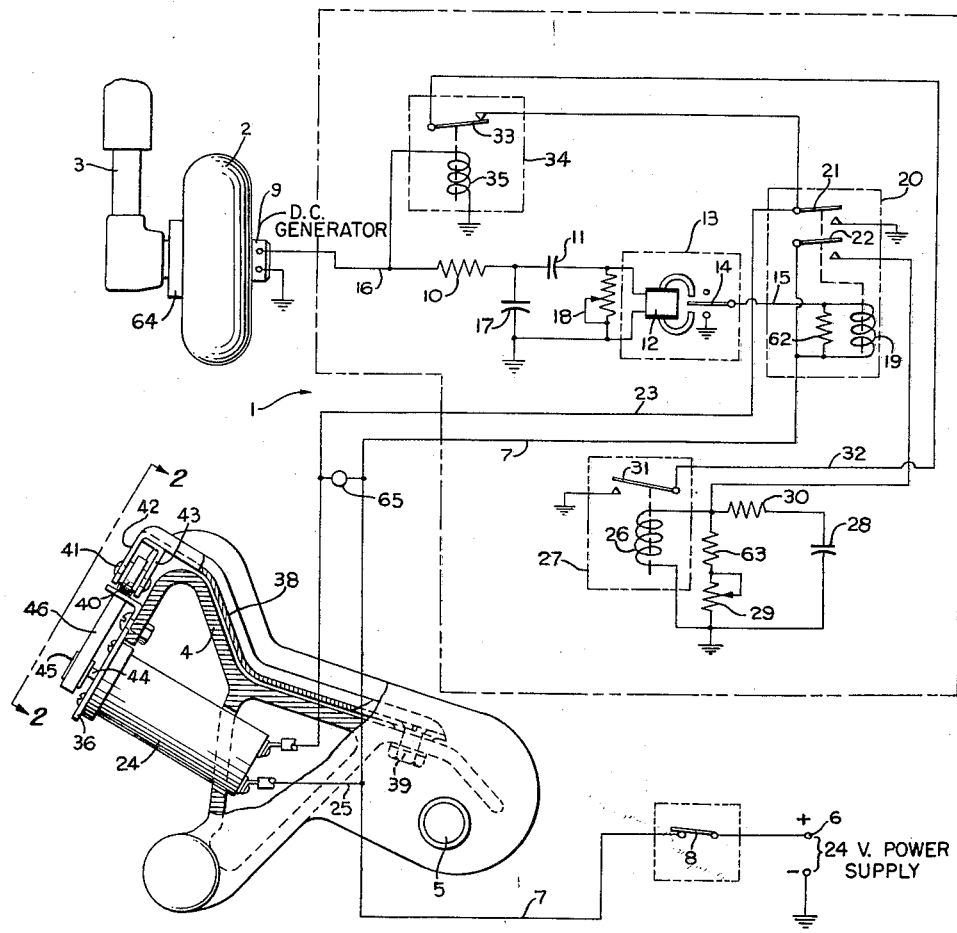

Nov. 14, 1961     J. R. STEIGERWALD     3,009,132
INDICATOR MEANS FOR USE WITH SKID WARNING SYSTEMS
Filed Sept. 8, 1959

*INVENTOR.*
JOHN R. STEIGERWALD
BY
*J. B. Holden*
ATTORNEY

United States Patent Office 3,009,132
Patented Nov. 14, 1961

3,009,132
INDICATOR MEANS FOR USE WITH SKID
WARNING SYSTEMS
John R. Steigerwald, Canton, Ohio, assignor to The
Goodyear Tire & Rubber Company, Akron, Ohio, a
corporation of Ohio
Filed Sept. 8, 1959, Ser. No. 838,750
4 Claims. (Cl. 340—52)

This invention relates to indicator or warning means for use with wheel slip or skid warning systems, and especially to indicator means by which the actuator of a braking mechanism can be mechanically advised of the fact that undesired conditions exist in the braked member.

The present invention particularly relates to apparatus for indicating, or warning a driver or pilot of the existence of skidding, or undesirable slipping conditions in a wheel of a vehicle, such as an aircraft, and it will be so described hereinafter. However, it will be realized that the principles of the invention could be used on any desired type of a vehicle for a warning action.

The general object of the present invention is to provide an uncomplicated, relatively inexpensive warning means or apparatus for use in vehicles whereby the actuator of a braking means is physically advised of some malfunctioning of the vehicle, such as the fact that undesirable conditions exist on a braked wheel.

Another object of the invention is to warn a person immediately by means physically contacting the person's foot, for example, when a braked wheel that he controls is functioning improperly.

A further object of the invention is to provide warning apparatus that physically indicates to a person applying a braking force that undesirable action is resulting and to have the person instinctively reduce the braking action with a minimum of psychological action after such indication has been received.

Another object of the invention is to provide indicator means that is easy to install on existing aircraft structures; and to provide warning or indicator means which aids a pilot in his physical control of braking action for maximum efficiency thereof.

A further object of the invention is to position a mechanical agitator member directly on a brake pedal as an attachment thereon and to connect such agitator member to a control such as a sensing means whereby when slip or skid conditions exist in a braked wheel, the mechanical agitator will physically vibrate to shake or contact the foot of the person actuating the brake pedal to warn of undesired action in the braked wheel.

Yet another object of the invention is to provide an auxiliary brake pedal section which can be superimposed upon a standard brake pedal and be caused to be vibrated when undesirable conditions exist on a braked wheel controlled by such brake pedal.

The foregoing and other objects and advantages of the invention will be made more apparent as the specification proceeds.

For a better understanding of the invention, attention now is directed to the accompanying drawings wherein:

FIG. 1 is a diagrammatic elevation of a brake pedal and an aircraft wheel and support having a warning system of the invention associated therewith, which warning system and apparatus embody the principles of the invention; and FIG. 2 is an elevation of the brake pedal taken on line 2—2 of FIG. 1.

When referring to corresponding parts shown in the drawings and referred to in the specification, corresponding numerals are used to facilitate reference between equivalent parts on the drawings and referred to in the specification.

In order to understand the present invention completely, reference should be had to the details of the control or warning sensing circuit shown in the accompanying drawing, and the numeral 1 is used to refer to the skid warning system and mechanism of the invention as a whole. This skid warning system 1 is used in conjunction with a conventional aircraft wheel 2, oleo support strut 3, and a brake pedal 4. The brake pedal is journalled on a suitable support shaft 5, as by engaging part of the sidewalls of the brake pedal 4. The remaining portions of the aircraft are not shown and form no part of the present invention.

A conventional power supply for the skid warning system of the invention is provided and a terminal 6 connects to a 24-volt D.C. supply, for example. However, A.C. or pulsating D.C. power supplies may be used, as desired. Power is supplied to the sensing circuit by a power supply lead 7 in which the control switch 8 is provided. This control switch 8 is normally positioned in the aircraft control cock pit and can be used to disconnect the skid warning system, when desired.

Power for controlling the skid warning system 1 of the invention is furnished by a D.C. generator 9 suitably associated with and driven by the wheel 2 with which the apparatus is to be used so that such generator 9 is driven at a speed proportional to the rotating speed of the wheel. The generator 9 when used with a large diameter wheel, such as a bomber wheel, has a capacity to generate 80 volts per 1000 r.p.m. at 8 watts, and when used with a smaller wheel diameter, for example used on a fighter airplane, is of a size or capacity to generate 40 volts per 1000 r.p.m. again at 8 watts. Energy supplied from the generator 9, as long as the speed of such generator is changing, will flow via lead 16 through a resistance 10 (1000 ohms) and a condenser 11 (12 mfd.) and through an operating coil 12 of a normally open, polarized relay 13 used in the sensing circuit, as one important element thereof, to a ground connection. The relay 13 has a coil resistance of 2000 ohms and an operating voltage of .5 volt. It will be seen that current will flow through this operating coil 12 and the condenser 11 when the generator is decelerating and when such rate of deceleration is of a sufficient predetermined amount that a current of required strength and polarity will flow through the coil 12 to actuate the polarized relay 13 and close a circuit to ground from the power supply lead 7, relay 20, switch 14, and lead 15, as hereinafter described in more detail. Current also will flow through the coil 12 when the wheel 2 is accelerated and, if a sufficient amount of current flows, the polarized relay will be actuated in an opposite direction. A further control could be regulated by such acceleration actuation of the polarized relay 13, if desired, but is not normally used in the present invention and the contact on this side of the relay is not connected.

A condenser 17 (12 mfd.) is connected from ground to the connection between resistance 10 and condenser 11. The resistance 10 and condenser 17 form a filter circuit for ripple current flowing from the generator 9. A potentiometer 18 (25K) is connected in series with the condenser 11 and in parallel with the operating coil 12 to vary the sensitivity of such coil to deceleration of the wheel 2.

When the generator 9 is decelerating from excessive braking forces on the wheel 2 to send a pulse of energy through the coil 12, the polarized relay 13 will temporarily close the switch 14 to ground, which connects lead 15 to an operating coil 19 of a normally open control relay 20 and to actuate it. Power flows to the operating coil 19 from the power supply lead 7, when the switch 14 closes the ground circuit for such coil. The relay 20 has an operating voltage of from 18 to 30 volts and a coil resistance of 552 ohms. This normally open control relay 20 controls switches 21 and 22. The switch 21 connects to ground and to a lead 23 that extends to an actuator member, such as an electric motor 24, which is directly carried by the brake pedal 4 and functions as hereinafter explained in more detail. The power supply circuit for such motor 24 is completed by a lead 25 that connects to the power supply lead 7 of the skid warning system so that a power supply circuit for such motor 24 is completed whenever the polarized operating relay 13 is energized upon such deceleration of the wheel 2 so as to close the polarized relay 13, the relay 20 and the switch 21. It will be understood that the values given above and hereafter for the various components constitute one specific example and are not limiting.

*Locked wheel notification control*

The second control switch 22 of the relay 20 connects to the power supply lead 7 and couples it to an operating coil 26 of a third normally open relay 27 which has a slow release circuit means connected thereto for operation when continued deceleration of the wheels occurs. The relay 27 has a coil resistance of 12000 ohms, a drop-out voltage of 3.6 volts and a pickup voltage of 7.2 volts. This slow release circuit means comprises a condenser 28 (150 mfd.) connected in the circuit with the operating coil 26 and with current limiting resistance 63 (5600 ohms) and variable resistance 29 (.1 meg.) The resistances 63 and 29 are connected in parallel with such operating coil 26. A further limiter resistance 30 (27 ohms) is connected in series with the condenser 28. Thus after a pulse of energy has been transmitted to the coil 26 and associated means, the condenser 28 will be charged and current will slowly leak from such condenser 28 through the operating coil 26 to maintain such relay 27 and a switch 31 controlled thereby closed for a predetermined period, such as approximately two, three or four seconds, as desired. Variation in the values of the resistance 29 provided in the control circuit for the relay 27 will permit an accurate control of the time delay during which the relay 27 is maintained in its closed position.

The switch 31, controlled by the relay 27, connects a ground connection through a lead 32 to a normally closed switch 33 controlled by a fourth relay 34 having the same characteristics as relay 27. The opposite contact of the switch 33 connects to the power circuit lead 23 of the motor 24. Hence, as long as the switches 31 and 33 remain closed, the actuation of the motor 24 continues as such switches complete the ground circuit therefor. Such energization circuit is closed at practically the same instant that switch 21 is closed for initial temporary energization of the motor 24.

The relay 34 is opened on reacceleration of the wheel 2 and an operating coil 35 of the relay 34 connects to the lead 16 to receive energy from the generator 9 upon reacceleration of the wheel 2. Thus upon reacceleration of the wheel 2, the relay 34 is opened, and if the time delay relay 27 and switch 31 are still closed at such time, then the locked wheel ground circuit will be opened and cause the skid indicator or warning means of the invention to cease to operate, as will be described hereinafter in more detail.

It will be realized that the skid warning system described is actuated by an undesirable rapid deceleration of the vehicle wheel with which the warning system of the invention is associated. Thus actually such wheel usually will be slipping with relation to the ground to be approaching a skid condition when the sensing system is actuated to energize the vibrator indicator means of the invention. From tests conducted on braked aircraft wheels, it is noted that effective brake action is obtained even if the wheel (tire) is slipping with relation to the ground. That is, the braked wheel is moving at a slower speed than an unbraked wheel on the aircraft. Thus a theoretical figure of about 20 percent slippage between the braked wheel and an unbraked wheel on a vehicle has been thought to be a maximum value for such slippage for effective braking action. However, it is very difficult to maintain this amount of slippage and it also is difficult to measure the slippage accurately. In all events, a braking rate to produce a deceleration of the vehicle and unbraked wheel of about 10 ft. per second/per second is considered a very effective braking action in most instances. When greater braking forces are applied, effective braking action may still be secured but the braked wheel is then very apt to go very rapidly into skidding conditions. When conditions immediately approaching skidding exist, the braked wheel has been observed to have a rate of deceleration of well over 50 radians per second/per second. Thus the invention contemplates, as one example, having the polarized relay 13 actuated when a deceleration rate of about 50 radians per second/per second exists. Adjustment of the potentiometer 18 will vary the deceleration rate required to actuate the polarized relay 13. The invention can be considered to be operating when skid conditions have actually been established so that the terminology skid warning system is broadly used in the specification and claims to cover actuation of the indicator means when either skid conditions exist or when an undesirably rapid deceleration of the wheel is being effected so that the wheel may be approaching skid conditions. When the wheel is skidding, it is considered to be decelerating too rapidly as such expression is used in the specification and claims.

*Physical warning means*

FIGS. 1 and 2 show that the electric motor 24 is directly secured to the brake pedal 4 by means of a bracket plate 36 which has a continuous, or two transversely spaced flanges 37 at the upper margin thereof, as best indicated in FIG. 2 of the drawings. An auxiliary brake pedal plate 38 is provided and is secured on the top surface of the brake pedal 4 for pivotal action with relation thereto, as by means of a rivet or bolt 39 at one end of this auxiliary brake pedal 38 to leave the end adjacent the motor 24 free for pivotal movement. Such free end of the auxiliary brake pedal 38 is supported on the flanges 37, 37 by a pair of rollers 40, 40. The rollers are journalled on spindles or pins 41 carried by a flanged end 42 of the auxiliary brake pedal 38 and by means such as a separate flange plate 43 suitably secured thereto.

In order to vibrate or more the auxiliary brake pedal 38, the motor 24 has an output shaft 44 which has a cam 45 secured thereto. A positive action means such as a connector link 46 connects this cam 45 to the free end portion of the auxiliary brake pedal 38 by engaging a pin 47, for example, thereon. Thus as the shaft 44 rotates, the free end portion of the auxiliary brake pedal will be rapidly oscillated back and forth on the rollers 40, 40 and a physical indication that the skid approaching or actual skid conditions exists will be immediately and positively transmitted to the foot of the person operating the brake pedal 4. Such indication will be given appreciably before the pilot would be otherwise aware that excessive braking forces had been applied.

FIG. 1 shows that a resistance 62 (1000 ohms) is connected across the operating coil 19 of the control relay 20 and it is provided when the arcing of the contact 14, when opened, is to be controlled.

Conventional brake means 64 are shown in association with the wheel 2.

FIG. 1 of the drawings also shows that an indicator member 65 may be connected across the leads 7 and 23 in parallel with the motor 24. Such indicator member 65, for example, may be a light, or a buzzer to give a visual, or an audible signal to the pilot to show that some component of the agitator means is not functioning. Thus at such time, if a physical signal is not being received, the pilot would know that his skid warning system is not working properly. However, a feature of this invention is that the indicator signal for the person applying a braking force is physically transmitted to such person's foot. He instinctively will almost instantly recoil or remove braking forces on the brake pedal when such agitator signal is received and little or no thought process will be required, it is believed, to reduce the forces being applied to the brake pedal.

When it is desired to indicate the presence of skidding conditions or approaching such a condition in a plurality of wheel units, such as on an airplane wherein two braked wheels each on a separate support and two brake pedals are provided, then a separate sensing means would be incorporated with each braked wheel and a separate physical warning means or unit of the invention would be associated with each brake pedal. When more than one wheel is carried on one support strut for the airplane, then usually a separate sensing means would be incorporated with each braked wheel but only one warning means and one brake pedal is utilized for the plurality of wheels.

The sensing means used in the control of the invention may be of any suitable known construction. Such sensing means must indicate, usually by an electrical pulse, that excessive braking forces have been applied to the braked wheel and that skid conditions are approaching. This indication from the braked wheel is then used to actuate the physical warning means of the invention on the brake pedal. The sensing means described would broadly include the generator 9, control relays 13, 20, 27 and 34, and associated circuits. Parts or all of such sensing means can be varied, as desired, and a fluid motor, for example, might be substituted for the electric motor 24 or equivalent motors disclosed. Also, some controls, such as the locked wheel notification means, may be omitted and still have effective skid warning action by the other components of the combination of the invention.

This is a continuation-in-part of my prior and copending application Serial No. 643,825, filed March 4, 1957 issued March 22, 1960, No. 2,930,026.

From the foregoing it is seen that a novel and useful type of skid warning means has been provided by the invention and that the objects thereof have been achieved.

While a certain representative embodiment and details have been shown for the purposes of illustrating the invention, it will be apparent to those skilled in this art that various changes and modifications may be made therein without departing from the spirit or scope of the invention.

What is claimed is:

1. In combination with a brake pedal, an auxiliary brake pedal plate, means securing one end of said pedal plate to the brake pedal on the upper surface thereof for pivotal action laterally of the brake pedal, roller means positioning the opposite end of said pedal plate on said brake pedal for limited transverse movement thereon, an electric motor having a rotatable output shaft and mounted on the brake pedal and controllable by a separate sensing means, and cam and link means connecting the output shaft of said motor to the said opposite end of said pedal plate to oscillate such pedal plate laterally by positive movement control action on energization of said motor.

2. In combination with a brake pedal, an auxiliary brake pedal plate, pivot means securing one end of said pedal plate to the brake pedal on the upper surface thereof for pivotal movement laterally of the brake pedal, roller means operatively posaitioning the opposite end of said pedal plate on said brake pedal for movement thereon, an electric motor having a rotatable output shaft and mounted on the brake pedal, and link means connecting the output shaft of said motor to the said opposite end of said pedal plate to oscillate such pedal plate laterally of said brake pedal on energization of said motor.

3. In combination with a brake pedal, an auxiliary pedal plate, means movably securing said pedal plate to the brake pedal for relative movement lateral thereof on the upper surface thereof and protruding marginally upward therebeyond, an electric motor having a rotatable output shaft and mounted on the brake pedal and controllable by an external power source, and positive action means connecting the output shaft of said motor to the said pedal plate to move such pedal plate laterally of the brake pedal on energization of said motor and to pull such pedal plate back laterally of the brake pedal.

4. In combination with a brake pedal, an auxiliary brake pedal plate, means securing one portion of said pedal plate to the brake pedal on the upper surface thereof for pivotal action laterally of the brake pedal, roller means carried by said auxiliary brake pedal plate, means carried by said brake pedal positioning the opposite end of said pedal plate on said brake pedal by engaging said roller means, an electric motor having a rotatable output shaft and mounted on the brake pedal, and cam and link means connecting the output shaft of said motor to the said opposite end of said pedal plate to oscillate such pedal plate laterally on energization of said motor.

References Cited in the file of this patent

UNITED STATES PATENTS

| | | |
|---|---|---|
| 2,128,250 | Howard et al. | Aug. 30, 1938 |
| 2,280,186 | Caldwell | Apr. 21, 1942 |
| 2,284,040 | Caldwell | May 26, 1942 |